G. CORNWALL.
Vehicle-Wheel Tire.
No. 197,102. Patented Nov. 13, 1877.
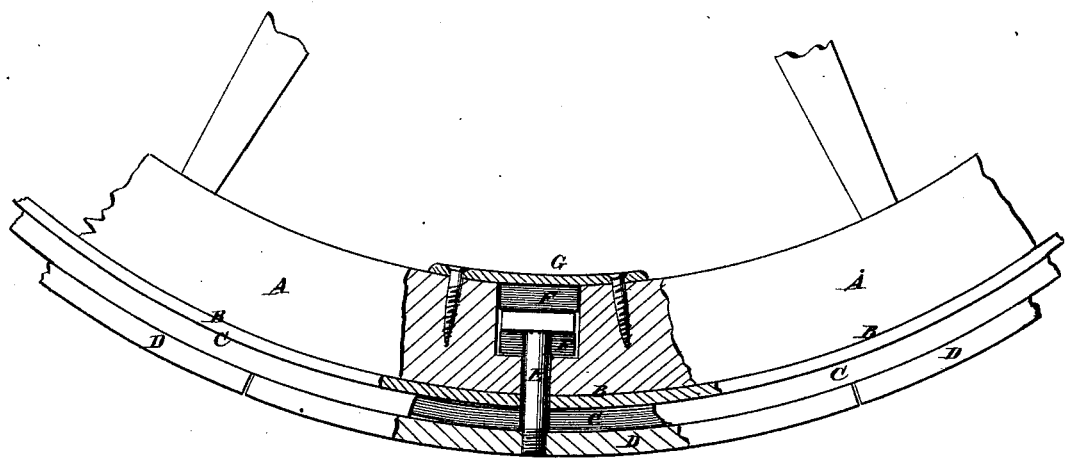
WITNESSES:
INVENTOR:
G. Cornwall.
BY
ATTORNEYS.

UNITED STATES PATENT OFFICE.

GEORGE CORNWALL, OF GARDEN CITY, NEW YORK.

IMPROVEMENT IN VEHICLE-WHEEL TIRES.

Specification forming part of Letters Patent No. 197,102, dated November 13, 1877; application filed April 16, 1877.

*To all whom it may concern:*

Be it known that I, GEORGE CORNWALL, of Garden City, in the county of Queens and State of New York, have invented a new and useful Improvement in Tires for Wheels, of which the following is a specification:

The figure is a side view of a portion of the rim of a wheel to which my improvement has been applied, part being broken away to show the construction.

The object of this invention is to furnish tires for the wheels of cars, carriages, and other vehicles, which shall be so constructed as to yield as the wheel moves forward upon a track, pavement, or the ground, and thus greatly diminish the noise, jar, and wear, and greatly increase the comfort of the passengers and of those living upon the line of the road or street.

The invention will first be described in connection with the drawing, and then pointed out in the claim.

I will describe the invention as applied to a carriage-wheel, though the construction will be substantially the same whatever be the kind of wheel to which it is applied.

A represents the fellies of the wheel, around which is placed a light iron tire, B, in the usual way.

Around the iron tire B is passed a rubber tire, C, of a greater or less thickness, according to the size of the wheel and the greater or less load it will be required to support.

Around the rubber tire C is placed an iron tire, D, which is made in sections, so that each section may yield or move inward as the weight comes upon it, so as to prevent noise, jarring, and wear.

The sections D are secured in place by bolts E, which pass out through the fellies A, the iron tire B, and the rubber tire C, and are screwed, riveted, or otherwise secured in holes in the sections D, so that the said bolts E may move in and out with the said sections D. The bolts E are made with flat heads, which are countersunk into the fellies A, and have rubber blocks E, of about the same thickness as the rubber tire C, placed above and beneath them, as shown in the figure. The outer rubber blocks F are kept in place by metal caps G, attached to the inner sides of the fellies A, which caps may be extended into a continuous band, if desired.

Having thus described my invention, I claim as new and desire to secure by Letters Patent—

The combination, with an ordinary wheel surrounded by an elastic band, C, of an outer tire made in independent sections, D, connected with the wheel, substantially as shown and described.

GEORGE CORNWALL.

Witnesses:
JAMES T. GRAHAM,
C. SEDGWICK.